United States Patent [19]

Sasaki

[11] Patent Number: 4,728,964

[45] Date of Patent: Mar. 1, 1988

[54] RECORDING APPARATUS WITH AN INDICATOR FOR INDICATING CURRENT RECORDING CONDITIONS

[75] Inventor: Ryoichi Sasaki, Nagoya, Japan

[73] Assignee: Brother Kogyo Kabushiki Kaisha, Aichi, Japan

[21] Appl. No.: 850,030

[22] Filed: Apr. 10, 1986

[30] Foreign Application Priority Data

Apr. 13, 1985 [JP] Japan .................................. 60-78795

[51] Int. Cl.⁴ .......................... G01D 9/00; B41J 11/44
[52] U.S. Cl. .................................. 346/33 R; 364/520; 400/18; 400/61; 400/76
[58] Field of Search ............... 346/33 R, 17; 364/520; 400/17, 18, 19, 61, 62, 64, 65, 76, 279

[56] References Cited

U.S. PATENT DOCUMENTS

| | | | |
|---|---|---|---|
| 4,426,166 | 1/1984 | Bowling | 400/62 |
| 4,603,396 | 7/1986 | Washizuka et al. | 364/520 |
| 4,642,779 | 2/1987 | Sawada | 346/33 R |

*Primary Examiner*—E. A. Goldberg
*Assistant Examiner*—Mark Reinhart
*Attorney, Agent, or Firm*—Parkhurst & Oliff

[57] ABSTRACT

A recording apparatus having character keys, and selector keys for selecting one of a plurality of recording modes for each of at least two recording conditions selected from a plurality of conditions such as a recording direction, a character size, a recording color, and a line spacing. The apparatus includes a primary indicator, responsive to an operation of one or more of the selector keys to change at least one of the at least two recording conditions from one recording mode to another, for displaying a single special symbol to indicate the change of the at least one recording condition, without specifying the changed recording condition or conditions and the newly selected recording mode or modes of the changed condition or conditions. The apparatus further includes a secondary indicator, responsive to the operation of each selector key, for displaying a mode indication symbol to indicate the changed recording condition corresponding to each operated selector key, and the newly selected recording mode of the changed recording condition. The primary and secondary indicator are controlled by a controller in response to the operation of the selector keys.

10 Claims, 14 Drawing Figures

RECORDING APPARATUS WITH AN INDICATOR FOR INDICATING CURRENT RECORDING CONDITIONS

BACKGROUND OF THE INVENTION

1. Field of the Art

The present invention relates to a recording apparatus capable of recording characters, and indicating currently selected one of a plurality of recording modes of each of at least two recording conditions selected from a plurality of recording conditions such as recording direction, size and color, and a line spacing between adjacent print lines. More particularly, the invention is concerned with an indicator device for providing mode indication symbols indicative of the current recording modes of two or more recording conditions in such a recording apparatus.

2. Related Art Statement

The assignee of the present application developed a recording apparatus of the type indicated above, which includes a plurality of selector keys corresponding to at least two recording conditions as described above, as well as many character keys corresponding to characters such as letters, numerals and symbols. When a given recording condition is changed from one recording mode to another by the corresponding selector key, the newly selected recording mode is indicated by an appropriate indication symbol. This indication symbol appears on a screen of a suitable indicator device, which is adapted to display characters entered through the character keys. When two or more recording conditions, for example, the recording size and color and the line spacing are changed simultaneously, appropriate three indication symbols corresponding to the changed three conditions appear on the indicator device, to indicate the newly selected recording modes.

In the recording apparatus described above, however, the mode indication symbols displayed on the indicator device more or less disturb the operator in recognizing or perceiving the recording data displayed on the indicator device. Further, those indication symbols must be different from commonly used symbols such as "+", "%", "$". Accordingly, the use of the indication symbols causes an increase in the number of display patterns required and the amount of the display pattern data stored in a memory.

SUMMARY OF THE INVENTION

It is therefore an object of the present invention to provide a recording apparatus having an indicator device which provides indications of the currently selected recording modes of a plurality of recording conditions, with minimum disturbance to the perception of the recording data displayed on the indicator device.

According to the present invention, there is provided a recording apparatus having a function of indicating current recording conditions, comprising: (a) an input device including character keys corresponding to characters such as letters, numerals and symbols, and selector means for selecting one of a plurality of recording modes for each of at least two recording conditions selected from a plurality of recording conditions such as a recording direction, a size of the characters to be recorded, a color in which the characters are recorded, and a line spacing between adjacent lines of the characters; (b) primary indicator means, responsive to an operation of the selector means to change at least one of the at least two recording conditions from one of the recording modes to another, for displaying a single special symbol equivalent to a single character, to indicate the change of the at least one recording condition, without specifying the at least one recording condition and the newly selected recording mode of the at least one recording condition; (c) secondary indicator means, responsive to the operation of the selector means, for displaying a mode indication symbol to indicate the at least one recording condition which has been changed, and the newly selected recording mode of each of the at least one recording condition; and (d) indication control means for controlling the primary and secondary indicator means based on the operation of the selector means.

In the recording apparatus of the present invention described above, only one special symbol is displayed on the primary indicator means to indicate the change of at least one recording condition, irrespective of whether only one recording condition is changed or a plurality of recording conditions are changed at the same time. The display of the special symbol, which is equivalent in size to an ordinary character, informs the operator of the fact that a certain recording condition is changed, but does not significantly disturb the operator in perceiving the entered character data displayed on the primary indicator means. Further, the operator may confirm, with the mode indication symbol or symbols displayed on the secondary indicator means, the changed recording condition or conditions, and the newly selected recording mode or modes of the changed recording condition or conditions. Yet, the mode indication symbols on the secondary indicator means will not disturb the operator in perceiving the recording data, since the recording data is displayed on the primary indicator means.

According to one feature of the invention, the primary and secondary indicator means are constituted by a single display which has a display screen including a central area in which the special symbol is displayed, and a peripheral area in which the mode indication symbol for each of the at least two recording conditions is displayed.

According to another feature of the invention, the indication control means comprises: a program memory for storing a control program for controlling the primary and secondary indictor means; a mode register for storing mode-symbol data indicative of the newly selected recording mode of each of the at least two recording conditions; a special-symbol flag register for storing a special-symbol flag commanding the primary indicator means to display the special symbol; a display pattern memory for storing pattern data representative of a pattern of the special symbol; and a central processing unit cooperating with the mode register, the special-symbol flag register and the display pattern memory, to execute the program stored in the program memory.

In accordance with a further feature of the invention, the selector means consists of a plurality of selector keys corresponding to the at least two recording conditions, and the recording apparatus further comprises a text memory for storing character data representative of the characters entered through the character keys, and mode data representative of the newly selected recording mode of each of the at least one recording condition. The mode data is stored in the text memory each time one of the selector keys which corresponds to the each recording condition is operated and one of keys other than the one selector key is operated immediately after the operation of the one selector key. The mode symbol displayed on the secondary indicator means are changed each time the one selector key is operated.

According to a still further feature of the invention, the selector means consists of a plurality of selector keys correpsonding to the at least two recording conditions. The special symbol is displayed on the primary indicator means when the operation of one of the selector keys is followed by an operation of one of keys other than the selector keys. However, the special symbol is not displayed when the operation of the one selector key is followed by an operation of another of the selector keys.

According to yet further feature of the invention, the primary indicator means displays the characters entered through the character keys, as well as the special symbol, and has a cursor movable to one of the characters and the special symbol displayed. The secondary indicator means displays the mode indication symbol for each of the at least two recording conditions, upon positioning of the cursor at the special symbol, to indicate the newly selected recording mode which has been established at a position of the special symbol. The newly selected recording mode is changed to another recording mode by operating the selector means while the cursor is located at the position of the special symbol.

According to yet another embodiment of the invention, the primary indicator means displays the characters entered through the character keys, and the special symbol, in a horizontal line, and has a cursor movable to any one of the characters and the special symbol which are displayed. The secondary indicator means displays the mode indication symbol for each of the at least two recording conditions, such that the mode indication symbol for each of the at least one recording condition is changed when the cursor is moved past the special symbol in either one of opposite directions along the horizontal line.

In accordance with still another feature of the invention, the recording apparatus further comprises a text memory for storing character data representative of the characters entered through the character keys, and mode data representative of the newly selected recording mode of each of the at least one recording condition. The mode data is stored in the text memory each time the each recording condition is changed. The primary indicator means displays the entered characters and the special symbol, and has a cursor movable to any one of the displayed characters and special symbol. The input device further includes a delete key. The special symbol displayed on the primary indicator means and the mode data stored in the text memory are erased when the delete key is operated while the cursor is located at the special symbol. In this case, each of the displayed characters may be replaced by another character when the character key corresponding to the another character is operated while the cursor is located at the each displayed character. However, the special symbol is not replaced by the another character when the character key corresponding to the another character is operated while the cursor is located at the special symbol.

BRIEF DESCRIPTION OF THE DRAWING

These and other objects and many attendant advantages of this invention will be readily appreciated as the same becomes better understood by reference to the following detailed description when considered in connection with the accompanying drawing, in which.

DETAILED DESCRIPTION OF THE PREFERRED EMBODIMENT

Referring to the accompanying drawing, a preferred embodiment of the invention will be described in detail.

Figure 1:
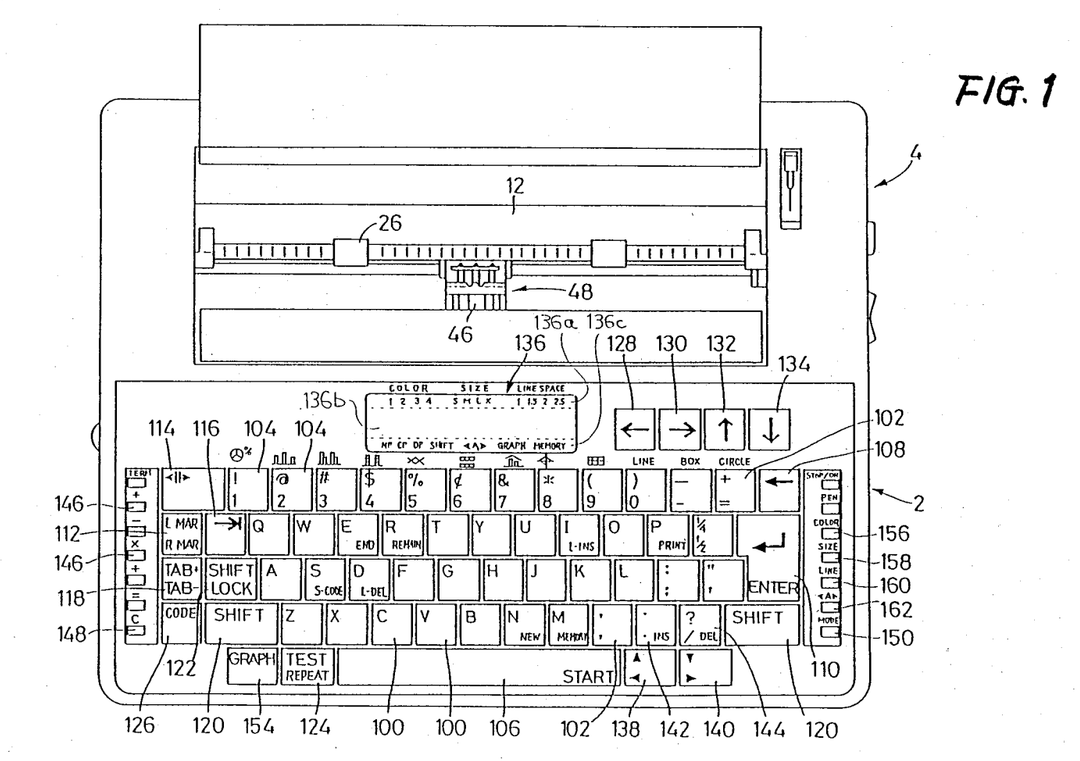
FIG. 1 is a schematic plan view of one embodiment of a recording apparatus of the invention in the form of a typewriter having a keyboard and using ball-point pens as writing instruments.

In a plan view of FIG. 1, there is shown one embodiment of a recording apparatus of the invention in the form of a typewriter which uses ball-point pens (described later) as writing instruments. The typewriter has a keyboard 2 at its front half, and a recording section 4 at its rear half.

Figure 2:
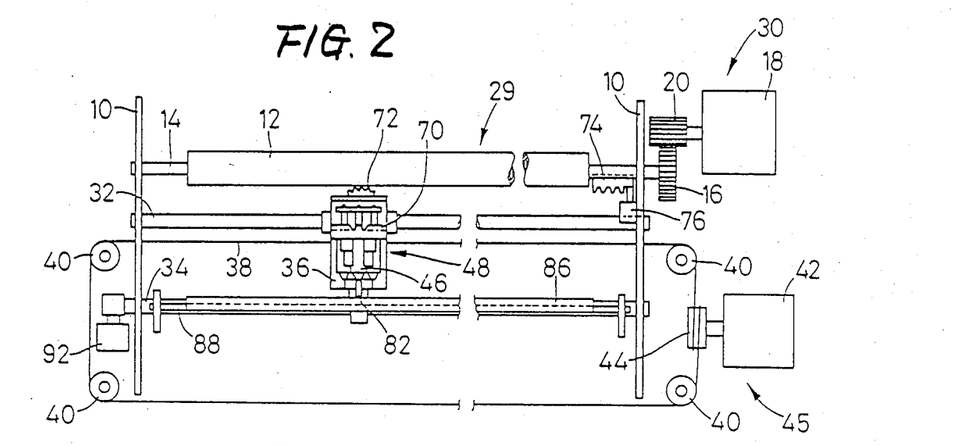
FIG. 2 is a schematic plan view of a recording mechanism of the typewriter of FIG. 1.

The recording section 4 has a recording mechanism which is schematically illustrated in FIG. 2, wherein reference numerals 10 designate a pair of opposed side frames of a main frame structure of the typewriter. These side frames 10 support rotatably a shaft 14 of an elongate cylindrical platen 12 which serves as a paper support member. The shaft 14 has a gear 16 fixed to one end thereof. The gear 16 meshes with a pinion 20 which is fixed to an output shaft 21 of a platen drive motor 18. The platen 12 is rotated by the motor 18 in selected one of opposite directions, i.e., either forward or reverse direction. The platen 12 cooperates with a paper pan 22, presser rollers 23, a paper guide 24, paper bail rollers 26, and other parts, to constitute a paper support device 29 which is adapted to guide and support a sheet of recording paper 28 along the circumferential surface of the platen 12. Thus, the gear 16, motor 18 and pinion 20 constitute a major part of a paper feeding device 30 for feeding the sheet of paper 28 in the Y-axis direction perpendicular to an axis of rotation of the platen 12.

Two mutually parallel guide rods 32, 34 extend parallel to the platen 12 between the opposed side frames 10. These two guide rods 32, 34 support a carriage 36 slidably along the length of the rods 32, 34. A carriage drive wire 38, which is fixed at its opposite ends to the carriage 36, is guided in a loop by four idler guide rollers 40. The drive wire 38 is wound on a driven pulley 44 fixed to an output shaft 41 of a carriage drive motor 42. With bidirectional rotary movements of the drive motor 42, the loop of the drive wire 38 is rotated in the corresponding directions, whereby the carriage 36 is reciprocated in opposite directions along the axis of platen 12, i.e., in the X-axis direction perpendicular to the Y-axis along which the sheet of paper 23 is fed by the paper feeding device 30. The carriage 36 carries a multi-station indexable pen-holding head 48 which supports recording instruments in the form of plural ball-point pens 46. In this arrangement, the ball-point pens 46 are moved in the X-axis direction when the carriage 36 is reciprocated. The guide rods 32, 34, carriage 36, drive wire 38, guide rollers 40, carriage drive motor 42, and pulley 44 constitute a major part of a pen driving device (carriage reciprocating device) 45 for moving the ball-point pens 46 in the X-axis direction. With the X-axis movements imparted to the pens 46 by this driving device 45, in combination with the Y-axis movements of the sheet of paper 28 imparted by the paper feeding device 30, the pens 46 on the carriage 36 are movable in any directions relative to the sheet of paper 28, whereby desired characters such as letters and symbols, and desired graphs may be recorded, i.e., written or plotted on the sheet of paper 28.

Figure 3:
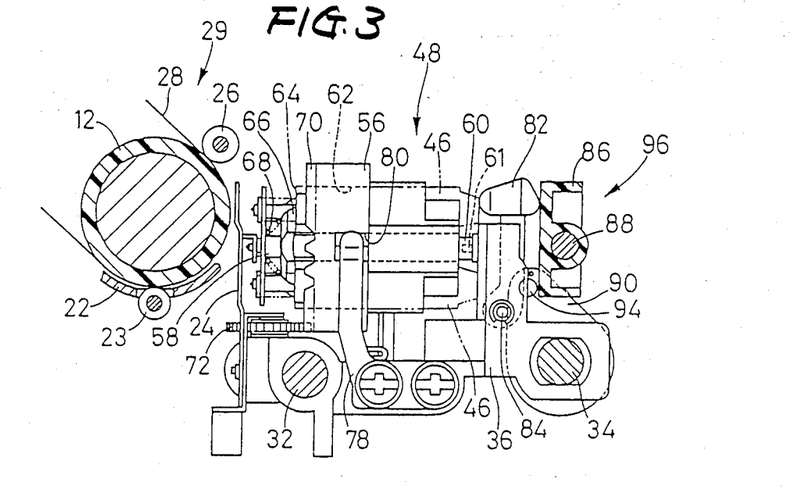
FIG. 3 is an enlarged elevational side view partly in cross section of a pen-holding head and its vicinities.

The multi-station indexable pen-holding head 48 is constructed as shown in FIG. 3. The pen-holding head 48 includes a holder body 56 which is supported on the carriage 36 rotatably or indexably about its axis substantially perpendicular to the axis of the platen 12. Stated more particularly, the pen holder body 56 has a short shaft 58 extending from its one end on the side of the platen 12, and a boss 60 formed at its other end. The short shaft 58 is rotatably supported by the paper guide 24, while a projection 61 extending from the carriage 36 is fitted in a recess formed in the boss 60 of the holder body 56. Thus, the holder body 56 is rotatably suported on the carriage 36. The holder body 56 has four pen holes 62 which are formed in evenly spaced-apart relation with each other in the circumferential direction of the holder body 56. In other words, the pen holes 62 are equiangularly spaced from each other along a circle whose center is alinged with the axis of rotation of the holder body 56. The four pen holes 62 accommodate the respective four ball-point pens 46 of different colors so that they are axially slidable in the holes 62. Thus, the holder body 56 carries the four ball-point pens 42. The end portion of each pen 46 on the side of its writing tip is smaller in diameter than the remaining portion, and terminates at a shoulder 64 on which a biasing force of a return spring 68 is exerted via a commonly used return plate 66.

The holder body 56 is provided, at its front end on the side of the platen 12, with a gear 70 which meshes with a pinion 72 supported on the carriage 30 rotatably about a vertical axis. As shown in FIG. 2, a stationary rack 74 is disposed adjacent to the right-hand side end (as viewed in FIG. 2) of the platen 12. Each time the pinion 72 is rotated by the rack 74, the holder body 56 is indexed so that each pen 46 may be brought into its writing position, i.e., the uppermost position at which the axis of the pen 46 is substantially normal to the surface of the platen 12. The rack 74 is operated by a solenoid 76, between its operative position in which the rack 74 engages the pinion 72, and its inoperative position in which the rack 74 is located away from the pinion 72. The holder body 56 is precisely positioned at each of the four index positions, by means of resilient engagement of a positioning spring 78 with the appropriate one of our V-notches 80 formed in the circumferential surafce of the holder body 56 as indicated in FIG. 3.

A hammer 82 is disposed behind the holder body 56, and supported on the carriage 36 pivotably about a pin 84. Behind the hammer 70 is disposed a hammer drive plate 86 which is pivotable about a shaft 88. In the meantime, the guide rod 34 has a lever 90 fixed thereto, and the lever 90 has a pin 94 fixed thereto. When the guide rod 34 is rotated clockwise (as seen in FIG. 3) upon activation of a latching solenoid 93 (FIG. 2) connected thereto, the hammer drive plate 86 is pivoted counterclockwise (as seen in FIG. 3) by the pin 94, and consequently the hammer 82 is pivoted in the same direction. As a result, the hammer 82 advances the currently selected ball-point pen 46 against the biasing force of the return spring 68 until the writing tip of the pen 46 contacts the surface of the sheet of paper 28. At this time, the return plate 66 is flexed by a predetermined angle to permit the pen 46 to advance. The hammer 82, hammer drive plate 86, lever 90, solenoid 92, constitute a device for reciprocating the selected ball-point pen 46 between its advanced position in which its writing tip contacts the paper 28, and its retracted position in which the writing tip is separated from the paper 28.

Referring back to FIG. 1, the keyboard 2 will be described. Like a keyboard as used for ordinary typewriters known in the art, the keyboard 2 has a multiplicity of character keys such as alphabetic keys 100, symbol keys 102 and numeral keys 104 and further has various function keys such as a space key (bar) 106, a backspace key 108, a carriage return key 110, a margin set key 112, a margin release key 114, a tab key 116, a tab set key 118, a shift key 120, a shift-lock key 122, a repeat key 124, a code key 126, PEN-LEFT jog key 128, PEN-RIGHT jog key 130, PEN-UP jog key 132 and PEN-DOWN jog key 134. The PEN-LEFT and PEN-RIGHT jog keys 128, 130 are used to move the selected pen 46 along the platen 12 in the left and right directions, respectively.

The PEN-UP and PEN-DOWN jog keys 132, 134, when activated, move the sheet of paper 28 up and down by a selected line-space distance. However, these jog keys 132, 134 are considered to serve as jog keys which are used to move the pen-holding head 48 (and consequently the selected pen 46) in the upward and downward directions, relative to the sheet of paper 28. Therefore, these jog keys 132, 134 are named as the PEN-UP and PEN-DOWN jog keys. The margin set key 112 functions to set a left-hand side margin position on the sheet of paper 28, when operated alone, and to set a right-hand side margin position on the paper 28, when operated together with the code key 126. Thus, the margin set key 112 and the code key 126 serve as setting means for determining a recordable range in the X-axis direction along the platen 12 (in the direction of width of the paper 28).

In an upper central part of the keyboard 2, there is provided a generally elongate rectangular liquid crystal display 136 which has a 15-digit capacity. As the character keys are operated successively, the corresponding characters are displayed on the display 136. The already displayed characters on the display 136 are sequentially shifted one position to the right each time a new character is keyed in. After the display 136 is filled with fifteen characters, the display 136 is overflowed, so that the rightmost character displayed on the display 136 disappears each time a new character (sixteenth and the following characters) is keyed in.

The keyboard 2 further comprises a graph key 154 which serves as a WRITING/PLOTTING selector key for selecting a WRITING mode for writing characters, or a PLOTTING mode for plotting graphs or other graphical representations (including a data table). The graph key 154 selects the WRITING and PLOTTING modes alternately upon repeated depression thereof. When the WRITING mode is selected, the typewriter is operable in one of three modes: DIRECT PRINT, CORRECTION PRINT, and NON-PRINT modes which are selected by a mode key 150. In the DIRECT PRINT mode, characters displayed on the display 136 are written on the paper 28 as the characters are keyed in through the keyboard 2, as in an ordinary typewriter. In the CORRECTION PRINT mode, keyed-in characters are not written as long as they remain on the display 136, that is, the keyed-in and displayed characters are written as they overflow from the display 136. In the NON-PRINT mode, the keyed-in and displayed characters will not be written even after the display 136 is overflowed. In the CORRECTION PRINT and NON-PRINT modes, the characters displayed on the display 136 may be corrected and edited by using an insert key 142 or a delete key 144 which is operated with the code key 126 to effect insertion or deletion of the desired characters at the positions designated by a cursor on the display 136. The cursor is moved on the display 136 by using cursor keys 138, 140. More specifically, desired data entered after the operation of the insert key 142 may be inserted before a character at which the cursor is positioned. Any displayed character may be deleted by operating the delete key 144 while the cursor is positioned at the character to be deleted, or may be replaced by a desired character by operating the character key corresponding to the desired character while the cursor is located at the character to be replaced. The NP mode is identical with the CP mode, except that the keyed-in and displayed characters will not be written or recorded even after the display 136 is overflowed. This NP mode in the WRITING mode is used to perform arithmetic operations (addition, subtraction, multiplication and division) by using arithmetic operator keys 146. The clear key 148 is used to clear the display 136 while in the NP or DP mode. When the clear key 148 is operated while in the CP mode, the displayed data is erased after the data has been recorded on the paper 28.

The instant typewriter is also operable in a MEMORY mode which is established by operating a MEMORY key, i.e., by simultaneous depression of the alphabetic key "M" 100 and the code key 116. With the typewriter set in the MEMORY mode, the keyed-in characters are stored in a TEXT memory 152 (which will be described referring to FIG. 5) as they are displayed and written when in the DP mode, or as they overflow from the display 136 when in the CP mode or NP mode. The characters keyed in and displayed in the NP mode are stored in the TEXT memory 152, without printing thereof on the paper 28. The TEXT memory 152 also stores data which are entered through the return key 110, tab key 116, PEN-LEFT, PEN-RIGHT, PEN-UP and PEN-DOWN jog keys 128, 130, 132 and 134. In the MEMORY mode, the characters currently displayed on the display 136 in the CP or NP mode may be edited in the previously described manner. Further, the already stored lines of characters may also be edited in all of the three modes including the DP mode. More specifically the cursor keys 138, 140, when operated alone, serve as CURSOR LEFT and CURSOR RIGHT keys which move the cursor leftward and rightward, respectively. However, when the CURSOR LEFT and CURSOR RIGHT keys 138, 140 are operated together with the code key 126, there keys 138, 140 serve as CURSOR UP and CURSOR DOWN keys, which move the cursor up and down to the desired one of the already stored lines preceding the currently displayed line. Thus, a previously stored line may be displayed on the display 136. After the editing or correction of a previous line is completed, the cursor may be returned to the current line of characters by operating the cursor key 140 together with the code key 126. The CURSOR keys are also used when it is desired to correct or edit the data already stored in the text memory 152. In this case, the desired portion of the stored data is retrieved from the text memory 152 while in the TEXT mode, and displayed on the display 136. The displayed data may be edited as needed, in the same manner as described above. The MEMORY mode is cancelled by operating an END key, i.e., by operating the alphabetic key "E" 100 together with the code key 126, whereby the typewriter is restored to the normal WRITING mode.

As previously indicated, the PLOTTING mode is established by operating the graph key 154 while in the WRITING mode. In the plotting mode, entered data may be presented in a selected graphical or tabular form. The PLOTTING mode is changed to the WRITING mode by operating the graph key 154 again. The numeral keys 104 corresponding to numerals "1" through "0", and the symbol keys 102 corresponding to symbols "—" and "=", are respectively assigned to select: circular graph (pie chart); simple bar graph; bar graph for a plurality of data groups; vertical band graph; broken-line graph; horizontal band graph; combination bar/broken-line graph; radar chart; tabulation (table of data); a segment defined by two points; a rectangle by a diagonal line defined by two points; and a circle defined by a center point and a point on the circumference. The above radar chart, segment, rectangle and circle are hereinafter referred to as "figures". When the PLOTTING mode is selected by the graph key 154, the display 136 provides a prompting or interrogating message asking the operator to select the kind or plotting operation to be performed. At this time, the desired graph, tabulation or figure may be selected by the corresponding key 104, 102. After the specific plotting or tabulating operation is selected by the appropriate numeral key 104 or symbol key 102, the numeral keys 104 function as the keys for entering numerical values which are represented in the designated graphical form (graph or figure) or in the designated tabular form (data table). The entered numerical data (numerical values) are stored into a graph memory 186 (which will be described) by operating the carriage return key 110. Namely, the carriage return key 110 serves as an ENTER key if activated in the PLOTTING mode. When the space key 106 and the code key 126 are operated simultaneously after all numerical values for a graph, for example, are entered, the plotting of that graph is started. If the repeat key 124 and the code key 124 are operated together after the entry of the numerical data, it is possible to check a range of plotting movements of the ball-point pen 46 on the paper 28, with the pen 46 moving in spaced-apart relation with the paper 28 (with the pen 46 placed in its retracted position), so as to indicate paths to be taken by the pen 46 according to the entered numerical values. The above-indicated numerical data constitutes a substantive portion of graph data necessary to record a graph or a data table. The graph data stored in the graph memory 186 may be retrieved by operating the appropriate numeral or symbol keys 104, 102, and displayed on the display 136. The displayed graph data may be edited or corrected in the same manner as used for editing the character data stored in the text memory 152.

At the right-hand side end of the keyboard 2, there are disposed several keys above the mode key 150. These keys include: a color selector key 156, a size selector key 158, a line-spacing selector key 160 and a vector key 162 (character-posture selector key). As described below in detail, these selector keys 156, 158, 160 and 162 serve as selector means, operable in the WRITING mode, for selecting desired recording modes associated with the recording conditions, that is, recording color, recording size, line spacing, and recording direction. More specifically, the color selector key 156 is used to select one of four pen-color modes, i.e., one of the four ball-point pens 46 of four different colors: black, red, blue and green. Each time the color selector key 156 is operated, the pen-color mode is changed from currently selected one of the four colors to another. The four pen colors are indicated by respective mode indication symbols [1], [2], [3] and [4] which are selectively displayed on the display 136. The displayed indication symbol is changed in the order of [1] - [2] - [3] - [4] - [1] as the color selector key 156 is repeatedly operated. The liquid crystal display 136 has a display screen which consists of three width portions parallel to the length of the screen, namely, an upper peripheral area 136a, a central area 136b and a lower peripheral area 136c. The central area 136b having a comparatively large width is assigned to display characters entered through the character keys. The upper peripheral area 136a is assigned to display the indication symbol [1], [2], [3] or [4] which indicates the currently selected pen-color mode (black, red, blue or green). Based on the operation of the color selector key 156, the pen-holding head 48 is indexed at a suitable point of time, to bring the pen 46 of the selected color into the recording position. The size selector key 158 is used to select one of four size modes, i.e., one of the four recording sizes: S, M, L and X. Each time the size selector key 158 is operated, the size mode is changed from currently selected one of the four sizes to another. These size modes are indicated by respective mode indication symbols [S], [M], [L] and [X] which are selectively displayed in the upper peripheral area 136 of the display 136, in that order as the size selector key 158 is repeatedly operated. Similarly, the line-spacing selector key 160 has four line-spacing mode positions: [1] (single space, [1.5] (one-and-a-half space), [2] (double space), and [2.5] (double-and-a-half space). These four line-spacing modes are indicated by respective symbols [1], [1.5], [2]and [2.5] which are also selectively displayed in the upper peripheral area 136a of the display 136a, in that order as the line-spacing selector key 160 is repeatedly operated. The vector key 162 is used to select one of three character-posture modes, i.e., one of three character positions: normal upright posture, a counterclockwise turned posture which is rotated counterclockwise 90 degrees with respect to the upright posture, and a clockwise turned posture which is rotated clockwise 90 degrees with respect to the upright posture. The normal upright posture is selected to record characters along a horizontal line, while the turned postures are selected to record characters along a vertical line, from the top toward the bottom of the paper 28 or vice versa. These three character-posture modes are indicated by respective symbols [A], [<] and [>] which are selectively displayed in the lower peripheral area 136c of the display 136, in that order as the vector key 162 is repeatedly operated.

All of the mode indication symbols [1], [2], [3], [4], [S], [M], [L], [X], etc. indicated above are displayed by activating respective indicator elements formed in corresponding patterns at the predetermined positions in the upper and lower peripheral areas 136a, 136c.

In the PLOTTING mode, the size selector key 158 serves to select a size of the graphical representation, and the vector key 162 functions to select the posture of the graph. The size and posture may be selected in the PLOTTING mode, independently of the size and posture selected in the WRITING mode.

Figure 4:
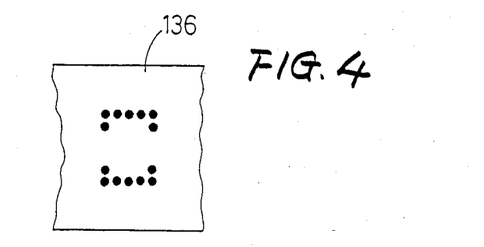
FIG. 4 is an illustration of an example of a special symbol provided on a liquid crystal display shown in FIG. 1, to indicate a change of a recording condition or conditions.

When at least one of the selector keys 156, 158, 160 and 162 is operated to change the corresponding recording condition or conditions (color, size, line-spacing, character-posture) while the typewriter is placed in the PLOTTING and MEMORY modes, the display 136 displays in its central area 136b a special symbol as indicated in FIG. 4, to indicate the change of the recording condition or conditions, irrespective of the number of the changed recording condition or conditions, and the newly selected mode or modes. This special symbol is equivalent in size to the ordinary characters entered through the character keys 100, 102, 104, and is displayed in the central area 136b together with the characters entered through those character keys. In the present invention, the central area 136b of the liquid crystal display 136 serves as primary indicator means for displaying the special symbol indicative of the change of the recording condition or conditions, while the upper and lower peripheral areas 136a, 136c of the display 136 serve as secondary indicator means for displaying the mode indication symbols indicative of the currently selected recording modes of the recording conditions (color, size, line-spacing and character posture). The lower peripheral area 136b is also used to provide indications to indicate the other currently selected modes of the typewriter: MEMORY mode or PLOTTING mode; NP, CP or DP mode (in the WRITING mode), and a SHIFT mode (established by the operation of the shift key 120).

Figure 5:
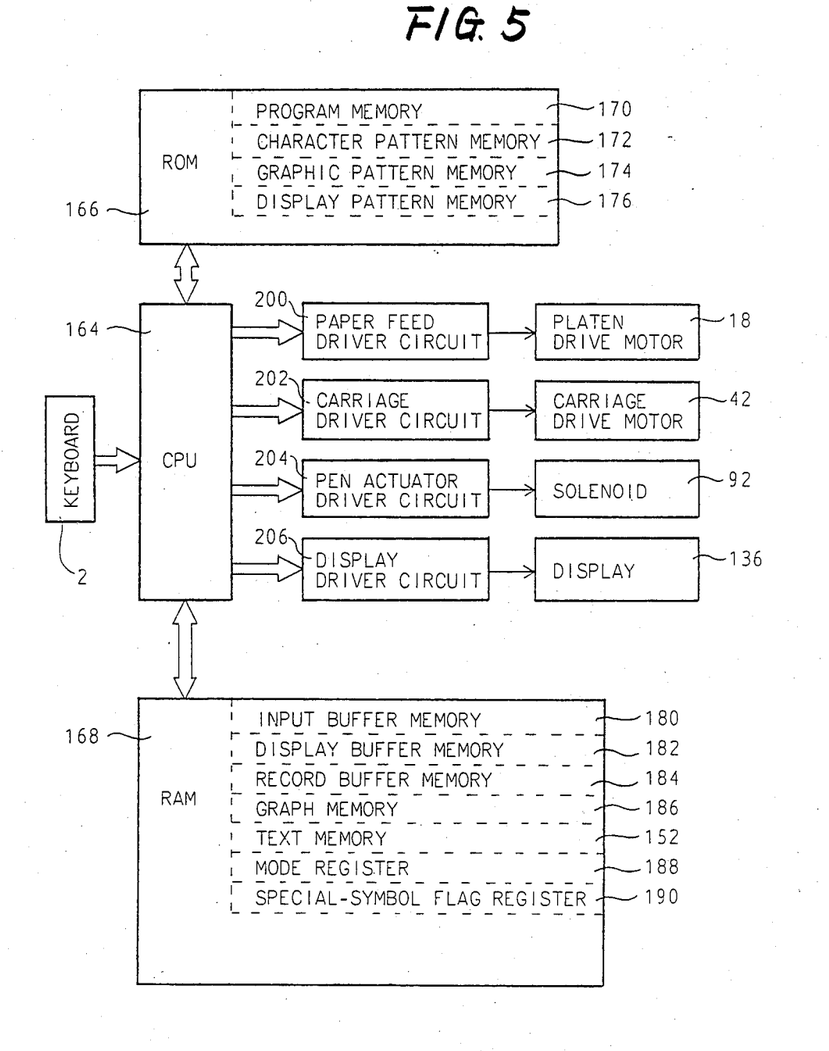
FIG. 5 is a block diagram of a control system for the typewriter of FIG. 1.

FIG. 5 shows a control system for controlling the recording section 4 and the display 136, according to input signals from an input device in the form of the keyboard 2. In the figure, reference numeral 164 designates a central processing unit (hereinafter referred to as CPU), to which is connected the keyboard 2. Also connected to the CPU 164 are a read only memory (hereinafter referred to as ROM) 166 and a random access memory (hereinafter called RAM) 168. The ROM 166 includes a program memory 170 storing a control program shown in FIG. 7, and other programs for controlling the operation of the typewriter. The ROM 166 further includes a character pattern memory 172 which stores multiple sets of character pattern data representative of patterns of the characters which are keyed in through keyboard 2, and a graphic pattern memory 174 which stores sets of graphic pattern data representative of graphic patterns and tabulation form which are designated through the numeral and symbol keys 104, 102 ("0" through "9", "—" and "=") previously described. The ROM 166 further includes a display pattern memory 176 which stores display pattern data representative of various patterns of the characters (entered through the character keys), prompting or interrogating messages, the previously described special symbol (shown in FIG. 4), that are to be displayed on the display 136.

The RAM 168 includes: an input buffer memory 180 for temporarily storing coded data which are keyed in through the keyboard 2; a display buffer memory 182 for storing coded data for the character to be displayed on the display 136; a record buffer memory 184 for temporarily storing coded data for the characters to be recorded by the recording section 4; the previously indicated graph memory 186 for storing a batch of graph data including numerical data which is presented in a selected graphical or tabular form defined by graphic pattern data in the graphic pattern memory 174; the previously indicated text memory 152 for storing a relatively large batch of keyed-in coded data entries; and other memories. The RAM 168 further includes a mode register 188 for storing mode-symbol data indicative of the newly selected recording mode of each of the recording conditions (recording color, size, direction, and line-spacing). The RAM 168 further includes a special-symbol flag register 190 for storing a special-symbol flag commanding the display 136 to display the special symbol of FIG. 4 in its central area 136b. The RAM 168 further includes other registers and counters necessary to execute the control programs for operating the typewriter. In this embodiment, the mode register 188 and the special-symbol flag register 190 cooperate with the CPU 164 and the display pattern memory 176 to constitute indication control means for controlling the operations of the primary and secondary indicator means in the form of the liquid crystal display 136.

There are also connected to the CPU 164 a paper feed driver circuit 200, a carriage driver circuit 202, a pen actuator driver circuit 204, and a display driver circuit 206. To these driver circuits 200, 202, 204, 206 are respectively connected the platen drive motor 18, carriage drive motor 42, solenoid 92 and display 136.

In the typewriter constructed as described above, the CPU 164 processes input signals received from the keyboard 2, according to the control programs and pattern data stored in the ROM 166, and by utilizing a temporary storage function of the RAM 168. Based on the processed signals, the CPU 164 controls the operations of the paper feed driver circuit 200, carriage driver circuit 202, pen actuator driver circuit 204 and display driver circuit 206, so as to write the entered characters while in the WRITING mode or present the entered numerical values in the selected graphic or tabular form while in the PLOTTING mode, and to display the entered data. In the MEMORY mode, the data entries through the keyboard 2 are stored in the text memory 152 or graph memory 186.

If the recording condition or conditions is/are changed by the appropriate selector keys 156, 158, 160 and 162 while the typewriter is in the MEMORY mode, the special symbol of FIG. 4 is displayed in the central area 136b of the liquid crystal display 136.

Figure 6A:
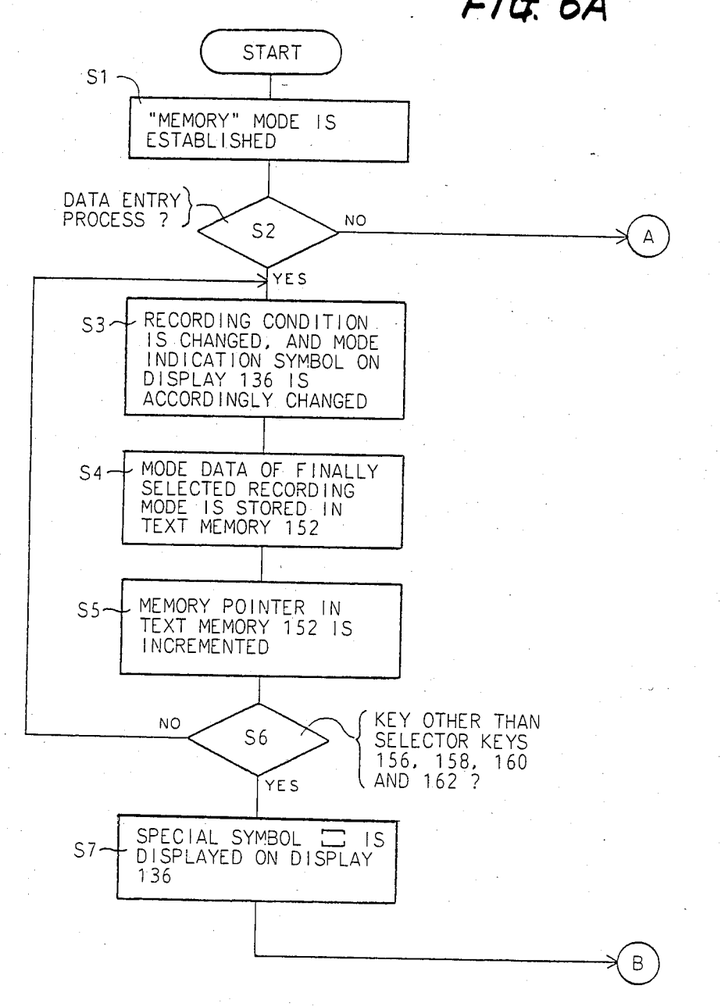
FIGS. 6(a) and 6(b) are a flow chart illustrating a control for controlling the operating of the typewriter, associated with the present invention.
Figure 6B:
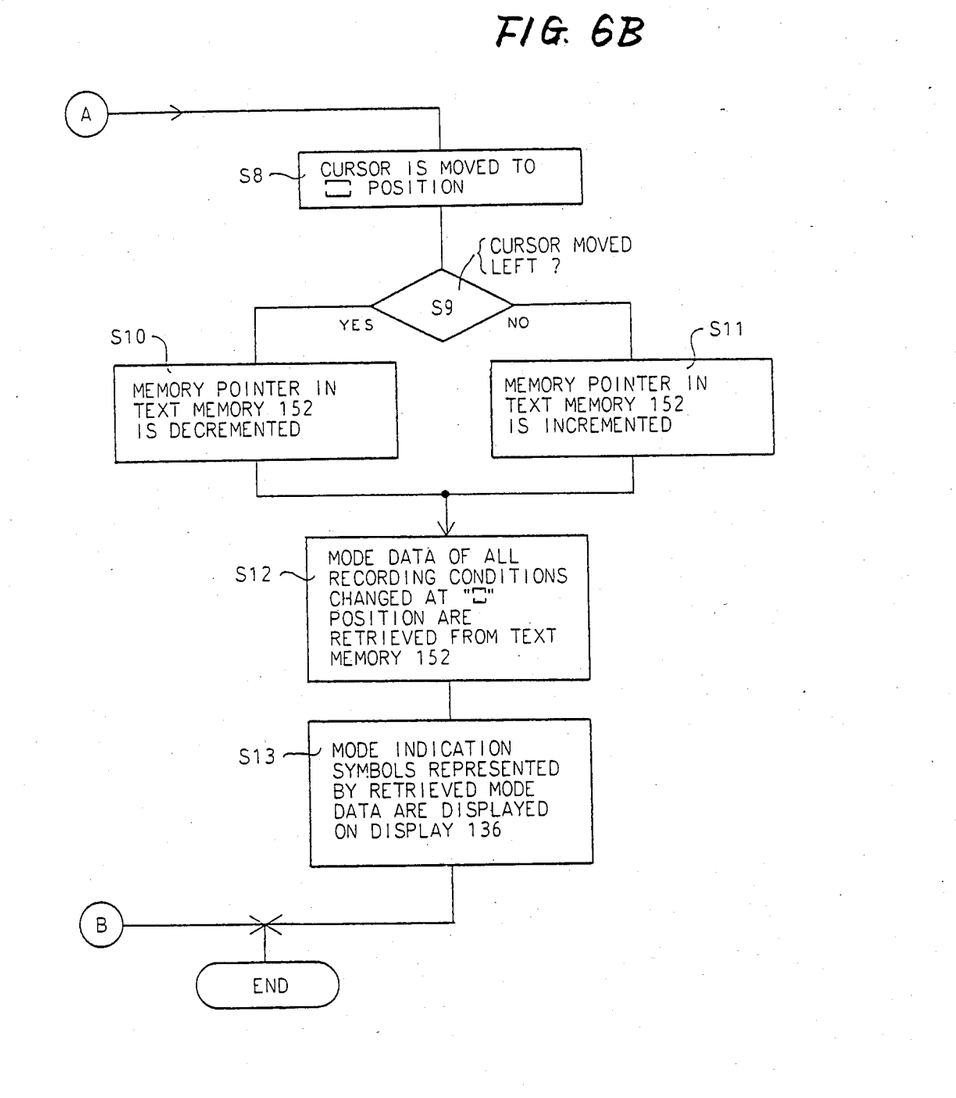
Figure 7:
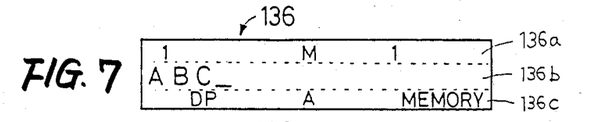
FIG. 7-13 are illustrations indicating different states of the liquid crystal display.

The operation of the typewriter associated with the concept of the present invention will be described referring to the flow chart of FIG. 6. When power is applied to the typewriter, the CPU 164 execute an initilizing routine (not shown) wherein the various counters and registers are cleared, and the display 136 displays in its peripheral areas 136a, 136c the mode indication symbols to indicate the normally selected recording modes. Namely, the upper peripheral area 136a provides the following mode indication symbols: [1] indicative of the black pen 46; [M] indicative of the medium character size; and [1] indicative of the single line space, as indicated in FIG. 7. Meanwhile, the lower peripheral area 136b provides the indication symbol [DP] indicative of the normally selected DP mode of the WRITING mode, and the indication symbol [A] indicative of the normal upright posture of the characters, as indicated in FIG. 7. If the MEMORY key (alphabetic key "M" 100 operated with the code key 126) is operated in this condition, the CPU 164 executes step S1 to establish the MEMORY mode. Step S1 is followed by step S2 wherein the CPU 164 checks if the typewriter is in a process of entering recording data through the keyboard 2 (i.e., in a process in which desired recording data is stored into the text memory 152), or in a process of editing or correcting the recording data stored in the text memory 152.

Figure 8:
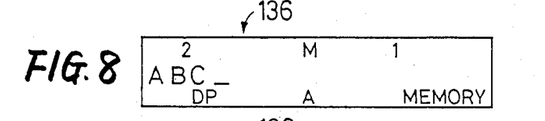
Figure 9:
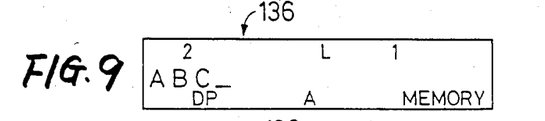
Figure 10:
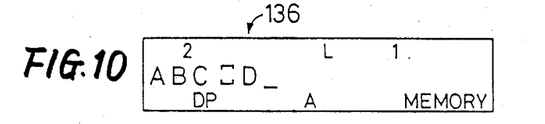

If the judgement in step S2 is affirmative (YES) and if any one of the color selector key 156, size slector key 158, lines-spacing selector key 160 and character-posture selectore key 162 is operated, step S2 is followed by step S3 wherein the appropriate recording condition is changed from one of the plural recording modes to another. As a result, the corresponding mode indication symbol in the upper peripheral area 136a of the display 136 is changed. For example, if the color selector key 156 is operated after the entry of characters "A", "B" and "C" as indicated in FIG. 7, the normally selected pen-color mode "BLACK" is changed to "RED", and the mode-symbol data in the mode register 188 is changed accordingly. Accordingly, the mode indication symbol [1] which has been displayed in the upper peripheral area 136a of the display 136 is replaced by the mode indication symbol [2] indicative of the newly selected pen 46 of red color as indicated in FIG. 8. Thus, the desired pen-color mode or the pen 46 of the desired color may be selected by operating the color selector key 156 suitable number of times. If the selector key 156 is operated two or three times, the mode indication symbol is changed to [3] or [4] in step S3. After the desired pen 46 is selected and the corresponding indication symbol is displayed on the display 136, the operator operates one of the keys other than the color selector key 156, for example, one of the alphabetic keys 100 and numeral keys 104, or one of the other selector keys 158, 160 and 162. At this time, the mode data representative of the newly selected pen-color mode (e.g. RED) is stored into the text memory 152 in step S4. Then, the CPU 164 goes to step S5 to increment a memory pointer in the text memory 152, so that the text memory 152 is ready to store the next data entry. Step S5 is followed by step S6 to check if a key other than the selector keys 156, 158, 160 and 162 is operated or not. As is apparent from the following description, this checking is made to judge whether the operation to change the recording condition or conditions is complete or not. If the judgement in step S6 is affirmative, step S6 is followed by step S7. If not, step S6 is followed by step S3 in which another selector key 158, 160 or 162 is operated to change the corresponding recording condition. For example, if the size selector key 158 is operated one time after the operation of the color selector key 156, the mode indication symbol displayed in the upper peripheral area 136a of the display 136 to indicate the recording size is changed from [M] to [L] in step S3. If one of the keys other than the selector keys 156, 158, 160, 162, for example, the alphabet key "D" 100 is operated after the size selector key 158, the mode data representative of the newly selected size [L] (large) is stored into the text memory 152 in step S4, and the memory pointer in the text memory 152 is incremented. In this case wherein the alphabetic key "D" is operated after the operations of the selector keys 156 and 158, the CPU 164 judges in step S6 that the operation for changing the recording condition or conditions is completed. Consequently, step S6 is followed by step S7 wherein a special-symbol flag is set in the special-symbol flag register 190 of the RAM 168. In response to this special-symbol flag, the CPU 164 retrieves from the display pattern memory 176 of the ROM 166 a set of display pattern representative of the special symbol of FIG. 4, and commands the display 136 to display the special symbol in its central area 136b, to the right of the already displayed character "C", as indicated in FIG. 10. Further, the character "D" which has been entered through the alphabetic key "D" 100 operated afater the size selector key 158 is displayed to the right of the special symbol, as indicated in FIG. 10.

As described above, the liquid crystal display 136 is adapted to display a single special symbol in the central area 136b, even when the two or more recording conditions are changed at one time by the appropriate selector keys (color and size selector keys 156, 158, in the illustrated example). Thus, the operator can know that at least one of the recording conditions is changed at the position indicated by the special symbol which is displayed together with the characters to be recorded. Since the special symbol is equivalent in size to the characters to be entered through the character keys, the operator is not significantly disturbed by the special symbol in perceiving the character data displayed in the central area 136b of the display 136. Further, the operator may know the changed recording condition or conditions, and the newly selected recording mode or modes thereof, by observing the mode indication symbols displayed in the upper and lower peripheral areas 136a, 136c of the display 136.

Unless the typewriter is placed in the DP mode of the WRITING mode, the operation of the color selector key 156 will merely result in changing the corresponding mode indication symbol in the upper peripheral area 136a of the display 136, but not cause the pen-holding head 48 to be indexed to select the newly selected pen 46.

The illustrated embodiment is adapted such that in the case of changing two or more recording conditions successively, each set of mode data representative of the newly selected recording mode is stored in the text memory 152 each time one of the selector keys 156, 158, 160, 162, and one of the keys other than the operated selector key are operated successively. However, it is possible that all sets of mode data representative of all newly selected recording modes are stored into the text memory 152 at the same time when any key (such as alphabetic keys 100) other than the selector keys 156, 158, 160, 162 is operated after the last operated selector key.

Figure 11:
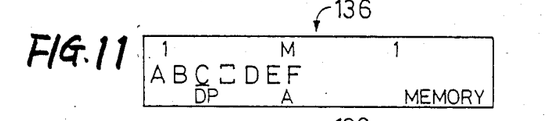
Figure 12:
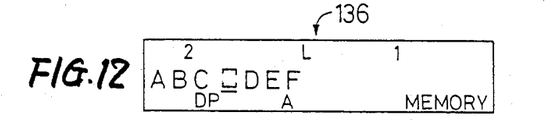
Figure 13:
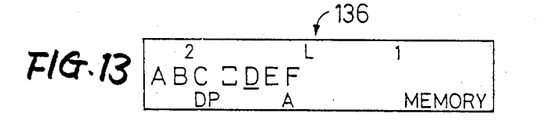

If the judgement in step S2 is negative (NO), this means that the typewriter is in a process of editing the character data stored in the text memory 152. In this case, the operator uses the cursor keys 138, 140, and the code key 126 if appropriate, to display the desired portion of the stored data in the central area 136b of the display 136, as indicated in FIGS. 11-13. In this condition, the mode data corresponding to the displayed special symbol, as well as the displayed characters, may be edited or corrected, or verified. For example, if the cursor is currently aligned with the letter "C" or "D" to the left or right of the special symbol, as indicated in FIGS. 11 or 13, the cursor key 140 or 138 is operated in step S8 to position the cursor in alignment with the special symbol, as indicated in FIG. 12. Then, the CPU 164 executes step S9 to check if the cursor has been moved leftward or not. If the judgemend in step S9 is affirmative (YES), namely, if the cursor has been moved leftward or not. If the judgement in step S9 is lowed by step S10 in which the memory pointer in the text memory 152 is decremented. If the judgement in step S9 is negative (NO), step S9 is followed by step S11 to increment the memory pointer in the text memory 152. Thus, the memory pointer designates a position in the text memory 152, which corresponds to the current position of the cursor (FIG. 12) aligned with the special symbol. Then, the CPU 164 executes step S12 in which all sets of mode data corresponding to the special symbol are retrieved from the text memory 152 as the memory pointer is automatically decremented or incremented depending upon the judgement in step S9. If the special symbol corresponds to one recording condition, that is, if a single set of mode data is stored corresponding to the special symbol, the memory pointer in the text memory 152 is not decremented or incremented in step S12. Successively, the CPU 164 executes step S13 to command the display 136 to display in its peripheral areas 136a, 136c the mode indication symbols indicative of the recording modes corresponding to the displayed special symbol, namely, the recording modes which have been established at the position designated by the cursor. Thus, the mode data stored in the text memory 152 is indicated in the peripheral areas 136a, 136c of the display 136. This condition is shown in FIG. 12.

The mode data stored in the text memory 152 and the corresponding mode indication symbols thus displayed on the display 136 may be changed by operating the appropriate selector keys 156, 158, 160, 162 after the execution of step S13.

Further, it is possible to insert mode data of another recording condition at a desired position in the text memory 152. In this case, the cursor is moved to the corresponding position, and the appropriate selector key is operated after the operation of the insert key 142. As a result of this insertion of the mode data, the special symbol of FIG. 4 is displayed at the corresponding position in the central area 136b of the display 136. If the delete key 144 is operated with the cursor positioned at the special symbol as shown in FIG. 12, that special symbol and the corresponding mode data are erased. In this case, the typewriter is restored to the normal recording mode of the corresponding recording condition. For example, if the mode data representative of the size [L] is erased, the typewriter is placed in the size [M] mode. The special symbol will not be replaced by an ordinary character, even if the corresponding character key such as the alphabetic or numeral key 100, 104 is operated with the cursor positioned at the special symbol.

As is apparent from FIGS. 11 and 13, the mode indication symbols on the display 136 are changed when the cursor is moved past the special symbol in the leftward or rightward direction. That is, the displayed mode indication symbols indicate the recording modes of the recording conditions which are established at the current position of the cursor.

While the present invention has been described in its preferred embodiment for illustrative purpose only, it is to be understood that the invention is not confined to the precise details of the disclosure contained herein, but the invention may be embodied otherwise. For instance, the special symbol of FIG. 5 may be replaced by other symbols which are distinct from commonly used symbols. Further, the number of recording conditions controllable by selector keys, and the number of recording modes of each recording condition, may be changed as desired. It is possible to use two separate indicator devices in place of a single indicator in the form of the display 136 which consists of the central area 136b serving as the primary indicator means, and the peripheral areas 136a, 136c serving as the secondary indicator means. Further, the primary and secondary indicator means may be provided in the form of an electro-luminescent display (EL), a fluorescent display tube (VFD), a plasma display panel (PDP), a flat CRT or any other suitable display device.

It will be obvious to those skilled in the art that various other changes, modifications and improvements may be made in the invention without departing from the spirit and scope of the invention defined in the appended claims.

What is claimed is:

1. A recording apparatus having a function of indicating current recording conditions, comprising:
    an input device including character keys corresponding to characters such as letters, numerals and symbols, and selector means for selecting one of a plurality of recording modes for each of at least two recording conditions selected from a plurality of recording conditions such as a recording direction, a size of the characters to be recorded, a color in which the characters are recorded, and a line spacing between adjacent lines of the characters;
    primary indicator means, responsive to an operation of said selector means to change at least one of said at least two recording conditions from one of said recording modes to another, for displaying a single special symbol equivalent to a single character, to indicate the change of said at least one recording condition, without specifying said at least one recording condition and the newly selected recording mode of said at least one recording condition;
    secondary indicator means, responsive to said operation of said selector means, for displaying a mode indication symbol to indicate said at least one recording condition which has been changed, and said newly selected recording mode of each of said at least one recording condition; and
    indication control means for controlling said primary and secondary indicator means based on the operation of said selector means.

2. A recording apparatus according to claim 1, wherein said primary and secondary indicator means are constituted by a single display which has a display screen including a central area in which said special symbol is displayed, and a peripheral area in which said mode indication symbol for each of said at least two recording conditions is displayed.

3. A recording apparatus according to claim 1, wherein said selector means consists of a plurality of selector keys corresponding to said at least two recording conditions, the recording apparatus further comprising a text memory for storing characer data representative of the characters entered through said character keys, and mode data representative of said newly selected recording mode of each of said at least one recording condition, said mode data being stored in said text memory each time one of said selector keys which corresponds to said each recording condition is operated and one of keys other than said one selector key is operated immediately after the operation of said one selector key, said mode symbol displayed on said secondary indicator means being changed each time said one selector key is operated.

4. A recording apparatus according to claim 1, wherein said primary indicator means displays the characters entered through said character keys, and said special symbol, in a horizontal line, and has a cursor movable to any one of said characters and said special symbol which are displayed, said secondary indicator means displaying said mode indication symbol for each of said at least two recording conditions, such that said mode indication symbol for each of said at least one recording condition is changed when said cursor is moved past said special symbol in either one of opposite direction along said horizontal line.

5. A recording apparatus according to claim 1, further comprising a text memory for storing character data representative of the characters entered through said character keys, and mode data representative of said newly selected recording mode of each of said at least one recording condition, said mode data being stored in said text memory each time said each recording condition is changed, said primary indicator means displaying said entered characters and said special symbol, and having a cursor movable to any one of said displayed characters and special symbol, said input device further including a delete key, said special symbol displayed on said primary indicator means and mode data stored in said text memory being erased when said delete key is operated while said cursor is located at said special symbol.

6. A recording apparatus according to claim 5, wherein each of said displayed characters is replaced by another character when the character key corresponding to said another character is operated while said cursor is located at said each displayed character, said special symbol being not replaced by said another character when said character key corresponding to said another character is operated while said cursor is located at said special symbol.

7. A recording apparatus having a function of indicating current recording conditions, comprising:
    an input device including character keys corresponding to characters such as letters, numerals and symbols, and a plurality of selector keys corresponding to a plurality of recording conditions such as a recording direction, a size of the characters to be recorded, a color in which the characters are recorded, and a line spacing between adjacent lines of the characters, each of said selector keys being operable to select one of a plurality of recording modes for the corresponding one of said recording conditions;
    primary indicator means, responsive to an operation of said selector keys to change at least one of said plurality of recording conditions from one of said recording modes to another, for displaying a single special symbol equivalent to a single character, to indicate the change of said at least one recording condition, without specifying said at least one recording condition and the newly selected recording mode of each of said at least one recording condition;
    secondary indicator means, responsive to said operation of said selector keys, for displaying a mode indication symbol to indicate said at least one recording condition which has been changed, and said newly selected recording mode of each of said at least one recording condition; and indication control means for controlling said primary and secondary indicator means based on the operation of said selector keys, said indication control means commanding said primary indicator means to display said special symbol when the operation of one of said selector keys is followed by an operation of one of keys other than said selector keys, and not commanding said primary indicator means to display said special symbol when the operation of said one selector key is followed by an operation of another of said selector keys.

8. A recording apparatus according to claim 7, wherein said indication control means comprises:

a program for storing a control program for controlling said primary and secondary indicator means;

a mode register for storing mode-symbol data indicative of said newly selected recording mode of each of said at least two recording conditions;

a special-symbol flag reigster for storing a special-symbol flag commanding said primary indicator means to display said special symbol;

a display pattern memory for storing pattern data representative of a pattern of said special symbol; and a central processing unit cooperating with said mode register, said special-symbol flag register and said display pattern memory, to execute said program store in said program memory.

9. A recording apparatus having a function of indicating current recording conditions, comprising:

an input device including character keys corresponding to characters such as letters, numerals and symbols, and selector means for selecting one of a plurality of recording modes for each of at least two recording conditions selected from a plurality of recording conditions such as a recording direction, a size of the characters to be recorded, a color in which the characters are recorded, and a line spacing between adjacent lines of the characters;

primary indicator means, responsive to operations of said character keys, for displaying the characters entered through said character keys, said primary indicator means being also responsive to an operation of said selector means to change at least one of said at least two recording conditions from one of said recording modes to another, and displaying a single special symbol equivalent to a single character, to indicate the change of said at least one recording condition, without specifying said at least one recording condition and the newly selected recording mode of each of said at least one recording condition, said primary indicator means having a cursor movable to one of said characters and said special symbol which are displayed thereon;

secondary indicator means, responsive to said operation of said selector keys, for displaying a mode indication symbol to indicate said at least one recording condition which has been changed, and said newly selected recording mode of each of said at least one recording condition; and indication control means for controlling said primary and secondary indicator means based on the operation of said selector keys, said indication control means commanding said secondary indicator means to display said mode indication symbol for each of said at least two recording conditions, upon positioning of said cursor at said special symbol, to indicate said newly selected recording mode which has been established at a position of said special symbol, said newly selected recording mode being changed to another recording mode by operating said selector means while said cursor is located at said position of said special symbol.

10. A recording apparatus having a function of indicating current recording conditions, comprising:

an input device including character keys corresponding to characters such as letters, numerals and symbols, and selector means for selecting one of a plurality of recording modes for each of at least two recording conditions such as a recording direction, a size of the characters to be recorded, a color in which the characters are recorded, and a line spacing between adjacent lines of the characters;

primary indicator means, responsive to an operation of said selector means to change at least one of said at least two recording conditions from one of said recording modes to another, for displaying a single special symbol equivalent to a single character, to indicate the change of said at least one recording condition, without specifying said at least one recording condition and the newly selected recording mode of each of said at least one recording condition;

secondary indicator means, responsive to said operation of said selector keys, for displaying a mode indication symbol to indicate said at least one recording condition which has been changed, and said newly selected recording mode of each of said at least one recording condition; and indication control means for controlling said primary and secondary indicator means based on the operation of said selector keys, said indication control means comprising a program memory for storing a control program for controlling said primary and secondary indicator means, a mode register for storing mode-symbol data indicative of said newly selected recording mode of each of said at least two recording conditions, a special-symbol flag register for storing a special-symbol flag commanding said primary indicator means to display said special symbol, a display pattern memory for storing pattern data representative of a pattern of said special symbol, and a central processing unit cooperating with said mode register, said special-symbol flag register and said display pattern memory, to execute said program stored in said program memory.

* * * * *